United States Patent [19]

Chen et al.

[11] Patent Number: 5,006,596
[45] Date of Patent: Apr. 9, 1991

[54] SELF-INVERTING, WATER-IN-OIL EMULSIONS

[75] Inventors: Fu Chen, Newtown; Edward J. Connors, Blue Bell, both of Pa.

[73] Assignee: Betz Laboratories, Inc., Trevose, Pa.

[21] Appl. No.: 477,697

[22] Filed: Feb. 9, 1990

[51] Int. Cl.$^5$ .............................................. C08F 2/32
[52] U.S. Cl. ........................................ 524/555; 524/801
[58] Field of Search .................................... 524/555, 801

[56] References Cited

U.S. PATENT DOCUMENTS

| | | | |
|---|---|---|---|
| Re. 28,474 | 7/1974 | Anderson et al. | 260/29.6 |
| Re. 28,576 | 12/1983 | Anderson et al. | 523/336 |
| 3,284,393 | 11/1966 | Vanderhoff et al. | 260/29.6 |
| 3,624,019 | 11/1971 | Anderson et al. | 260/29.6 |
| 3,734,873 | 5/1973 | Anderson et al. | 260/29.6 |
| 3,896,161 | 7/1975 | Borden et al. | 260/486 |
| 3,997,492 | 12/1976 | Kane et al. | 260/29.6 |
| 4,022,731 | 5/1977 | Schmitt | 260/29.6 |
| 4,024,097 | 5/1977 | Slovinsky et al. | 260/29.6 |
| 4,075,411 | 2/1978 | Dickstein | 560/224 |
| 4,268,641 | 5/1981 | Koenig et al. | 525/367 |
| 4,339,371 | 7/1982 | Robinson et al. | 524/310 |
| 4,390,401 | 6/1983 | Costanza | 204/159 |
| 4,463,151 | 7/1984 | Schulz et al. | 526/307.5 |
| 4,618,648 | 10/1986 | Marten | 525/60 |
| 4,672,090 | 6/1987 | Chan | 524/728 |
| 4,702,844 | 10/1987 | Flesher et al. | 210/733 |
| 4,792,593 | 12/1988 | Schulz et al. | 526/240 |

FOREIGN PATENT DOCUMENTS 126528 11/1984 European Pat. Off. .
0126528 11/1984 European Pat. Off. .

OTHER PUBLICATIONS

Alcolac Technical Data—Sipomer HEM-5 & HEM-10 (undated).
Alcolac Material Safety Data Sheet—Sipomer PPGMM, Nov. 7, 1988.

*Primary Examiner*—Joseph L. Schofer
*Assistant Examiner*—Jeffrey T. Smith
*Attorney, Agent, or Firm*—Alexander D. Ricci; Gregory M. Hill

[57] ABSTRACT

The present disclosure is directed to water-in-oil emulsion polymers which are used to flocculate matter suspended in aqueous systems. The disclosure and invention are particularly relevent to emulsion polymers which are self-inverting.

14 Claims, No Drawings

SELF-INVERTING, WATER-IN-OIL EMULSIONS

FIELD OF THE INVENTION

The present invention pertains to composition-of-matter and use of water soluble polymers in the form of novel, self-inverting, water-in-oil emulsions. The polymers contained in these emulsions can be used for sludge dewatering, enhanced oil recovery, retention aids in papermaking, coal tailings, metal ore and plating waste treatments, etc.

BACKGROUND OF THE INVENTION

Water-soluble polymers contained within the discrete phase of water-in-oil emulsions, the so-called inverse emulsions, are a common article of commerce. Practically every company which sells to the industries in which high molecular weight water-soluble polymers are used markets the polymers in the form of these emulsions.

When first introduced to the marketplace, these emulsions consisted of a hydrocarbon continuous phase, the discrete phase containing the highly concentrated high molecular weight polymer and water (usually about 50% polymer and 50% water), and the emulsifying surfactant, which was of the oil-soluble, low HLB type. These emulsions were relatively stable, and required an "activator", added to the water of dilution, in order to invert in a reasonable time. (In order to be used, it is necessary to have the high molecular weight polymer in dilute aqueous solution). Although it has been claimed that the emulsions would invert without the use of an activator, it was found that this took an impractically long time, or impractically high agitation rates, to be commercially useful. In some cases, inversion without the activator did not occur at all. The activator is a water-soluble, high HLB-type surfactant. However, many users of these emulsions found that it was inconvenient to have a "two-barrel" treatment program, consisting of the emulsion in one drum, and the activator in the second drum. Each of these required its own concentration for use, with two separate feed rates that needed to be carefully monitored, i.e., if too little activator was used, the emulsion did not invert properly, and if too much activator was fed, the emulsion inverted too rapidly, which would cause feeding problems and gelation.

In recent years, the so-called "self-inverting" emulsions have been introduced. In these inverse emulsions, the inverting surfactant is contained in the emulsion package itself, thus only one drum is required for use. Because of the convenience of this approach, practically all inverse emulsions sold today are of the self-inverting type. However, these products are not without their own problems. The principal deficiency of these emulsions is their instability, caused by the presence of the destabilizing inverting surfactant. This leads to a shortened shelf life. In addition, these products must be agitated before use, since some settling occurs even with short storage times. In addition, the inverting surfactant, which is the last ingredient to be added to the formulation, again to minimize stability problems, must be carefully monitored in order to avoid the same kinds of problems alluded to above for the addition of activator. It would be advantageous if the inverse emulsion did not require a separate step of adding an inverting surfactant.

It is thus an object of this invention to provide a self-inverting water soluble polymer contained within a water-in-oil emulsion.

It is a further object of this invention to provide a self-inverting water-soluble polymer contained within a water-in-oil emulsion which inverts easily and does not require an inverting surfactant.

It is still a further object of this invention to provide a self-inverting water-soluble polymer contained within a water-in-oil emulsion which polymer is used to flocculate suspended inorganic and organic matter contained primarily in aqueous systems—such as those set forth in Flesher et al., hereinafter described and incorporated herein by reference.

PRIOR ART

Flesher et al., U.S. Pat. No. 4,702,844 describe a process for flocculating aqueous suspensions using a flocculant comprising acrylamide copolymers together with an ethylenically unsaturated monomer bearing certain similarity to the monomers which comprise a key part of our invention. This prior art differs from the present invention in a number of significant ways, the totality of which clearly makes the present invention quite different from that of Flesher et al. Firstly, the quantity of ethylenically unsaturated monomer in '844 which is useful is from 1.0 to 90% by weight of the total amount of the copolymers, whereas the similar monomer of the present invention provides the desired properties when used from about 0.01% to about 10%. Although the concentration of this key monomer in the present invention slightly over laps the concentration of the ethylenically unsaturated monomer in the '844 patent, the range is so different as to indicate both different mechanism of action of the monomers in the two inventions, and non-obviousness of the instant invention. Most significant is the fact that the '844 patent is only obliquely related to inverse emulsion systems. In addition, the ethylenically unsaturated monomer in the '844 patent requires preferentially a hydrocarbyl group containing at least 8 carbon atoms at the end of the alkoxyl part of the molecule (see claim 1, column 11, lines 35–36, column 4, lines 54–57, and all Examples). Although it is disclosed in '844 that the "R" group can be a polyoxyalkylene chain where the alkylene groups are propylene or higher (column 4, lines 55–57), this teaching does not appear to be consistent with the best mode of the invention, where the hydrocarbyl group of at least 8 carbons and preferably 10 to 24 carbon atoms is required to provide the necessary hydrophobicity (col. 3, lines 16–22). The key monomer of the present invention either does not require a hydrocarbyl "R" group, or, when present, the "R" group (designated as $R_3$ in Formula I of this application, which appears later herein) is required to be of chain length 4 or less, with the possibility that a chain length up to 7 might be successfully utilized. In addition, the '844 patent appears to be operative with anionic, cationic, and nonionic polymers, whereas the present invention is only operative with anionic and cationic polymers, again indicating the significant differences between the present invention and that of the '844 patent.

European Patent Application 0,126,528 (Allied Colloids Limited) discloses "dispersing systems" (i.e., emulsifying surfactants) and "distributing systems" (i.e., inverting surfactants), together with "polymerization stabilizers" for improving the stability, viscosity, and inverting characteristics of inverse emulsions. This very complex invention is not prior art for the present invention because: the "polar liquids" used in the dispersing and distributing systems are very different from the key monomers of the present invention; the "polymerization stabilizers", made using monomers similar to the key monomers of the instant invention, are not incorporated into the flocculant polymer as are the instant alkoxylated acrylate monomers. Indeed, the polymerization stabilizers of '528 appear to be insoluble in water, in that they are dissolved in the hydrocarbon continuous phase of the inverse emulsion. The polymerization stabilizers of '528 are also of low molecular weight (page 9, lines 1-5, in which oligomeric materials are disclosed), whereas the polymers of the present invention which incorporate the alkoxylated acrylate monomers are of very high molecular weight, indicating the very different nature of the two polymers. In addition, the disclosure of '528 reveals that the complex use of polar liquids apparently "encapsulates" (page 15, lines 14-21) the water soluble polymer, very analogous to the mode of action of an inverting surfactant. The essence of our invention is that an inverting surfactant is not necessary to allow the water-in-oil emulsion to easily invert into water.

DETAILED DESCRIPTION OF THE INVENTION

The present inventors have discovered a class of monomers, when copolymerized with water-soluble monomer(s) in inverse emulsion form, provide novel compositions which are self-inverting without the necessity of adding an inverting surfactant. The novel compositions invert rapidly when diluted into water. The novel compositions are useful in a number of applications. The class of monomers which imparts the self-inverting characteristics to the water-soluble high molecular weight polymers contained in the water-in-oil emulsions without the necessity of an inverting surfactant can be depicted by Formula I:

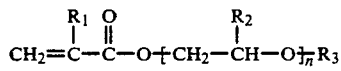
FORMULA I

Wherein
$R_1$ is hydrogen or methyl;
$R_2$ is hydrogen, methyl or ethyl;
$R_3$ is hydrogen or $C_1-C_4$ alkyl;
n is a number from 1-100

The monomer may be selected from the group comprising poly(ethyleneoxy), poly(propyleneoxy) and poly(butyleneoxy) ester derivatives of acrylic acid or methacrylic acid, although choice of these monomers is not limiting.

These acrylate ester comonomers can terminate in a free hydroxyl group, or be end-capped with a $C_1-C_4$ alkyl group such as methyl, ethyl, butyl, and the like. Preferred are monomers in which $R_3$ is hydrogen. Many of the comonomers can be prepared according to the teachings in U.S. Pat. Nos. 3,896,161; 4,075,411; 4,268,641; and 4,390,401. The comonomers can also be prepared with blocks of ethyleneoxy units followed by blocks of propyleneoxy units, or vice-versa, or a random mixture of both. Preferred is polypropylene glycol monomethacrylate, having 5-6 moles of propylene oxide, sold as PPGMM by Alcolac Chemical Corp. ($R_1$, $R_2$=methyl, $R_3$=hydrogen, n=5-6 in Formula 1).

The monomer of Formula I is a minor component of a water-soluble anionic or cationic copolymer of acrylamide. It is expected that water-soluble polymers based on other monomers than acrylamide, such as methacrylamide, acrylic acid, methacrylic acid, maleic acid, itaconic acid, lower alkyl esters of the above acids, and the like, would also be useful in accordance with the invention. The primary factors in designing the copolymeric system will be its water-solubility, ability to form high molecular weights, and cost. Polymers comprised of acrylamide together with anionic and cationic comonomers are preferred, but it is not to be construed that the invention is limited to these monomers.

Equivalents to a second monomer together with acrylamide are also within the scope of the instant invention. These would include moieties created when reactions are conducted on the polymer, such as hydrolysis of acrylamide to form an anionic functionality (functionally equivalent to copolymerizing acrylic acid with acrylamide), well-known reactions to form cationic functionalities on acrylamide polymers, or the like.

Typical cationic comonomers polymerized with acrylamide can be selected from dialkylaminoalkyl(meth)acrylamides, dialkylaminoalkyl (meth)acrylates and quaternary salts thereof, and diallyl dialkyl ammonium chloride. The quaternary ammonium salts may be obtained by quaternization of the tertiary amine compounds of said amides or acrylates with the customary quaternizing agents, preferably methyl chloride or dimethyl sulfate.

Preferred monomers comprise dimethylaminoethylacrylate, diethylaminoethylacrylate, dimethylaminoethylmethacrylate, diethylaminoethylmethacrylate, dimethylaminopropylmethacrylamide, dimethylaminopropylacrylamide, and methyl chloride or dimethyl sulfate quaternary salts of the above compounds, and diallyl dimethyl ammonium chloride.

Typical anionic comonomers copolymerized with acrylamide can be selected from acrylic acid, methacrylic acid, maleic acid, itaconic acid, and the like, and water-soluble salts thereof. These salts can include, but are not limited to, the sodium, potassium, and ammonium salts.

The mole percent of the comonomers in the polymers may vary within certain limits, provided that the total adds up to 100%. Preferably, the total of acrylamide and the ionic comonomer (anionic or cationic) will vary from about 90% to about 99.99%. The mole content of the monomer represented by Formula I will be about 0.01% and is expected to go as high as about 10% mole percent with 0.01% to 5% being preferred.

The molecular weight of the polymers described above may vary over a wide range, e.g., 10,000-30,000,000. The invention, however, finds its greatest usefulness when the acrylamide copolymers have molecular weights in excess of 1,000,000.

The copolymers are prepared by a water-in-oil emulsion technique. Such processes have been disclosed in U.S. Pat. No. 3,284,393; U.S. Pat. No. Re. 28,474, and U.S. Pat. Re. No. 28,576, herein incorporated by reference. The technique comprises:

Preparation of an aqueous phase, ranging from about 50% to about 90% by weight of the total emulsion, which aqueous phase is comprised of water, monomers as described above, chelating agents and initiator(s), if the particular initiator(s) chosen are water-soluble. Ethylenediamine tetraacetic acid or diethylenetriamine pentaacetic acid and their salts are suitable, but not limiting, chelating agents. The water-soluble initiator may be selected from peroxides, persulfates, bromates, and azo-type initiators such as 2,2' azobis-(2-amidinopropane) dihydrochloride, etc. Sulfites, bisulfites, sulfur dioxide, and other reducing agents used with oxidizing initiators to form an initiating redox pair may also be used. If a reducing agent is used, it is added as described below. The total amount of monomers will range from about 30% to about 80%, by weight, based on the total weight of the aqueous phase.

Preparation of an oil phase, ranging from about 10% to about 50% by weight of the total emulsion, which oil phase is comprised of a liquid organic hydrocarbon and water-in-oil emulsifying agents. A preferred group of hydrocarbon liquids include both aromatic and aliphatic compounds. Thus, such organic hydrocarbon liquids as benzene, xylene, toluene, mineral oils, kerosenes, naphthas and the like may be used. Oils commonly used for this purpose are the deodorized kerosenes, such as the commercially available materials sold under the trademarks of AMSCO OMS, Isopar M, and LOPS. The oil phase may optionally contain the initiator(s), if the particular initiator(s) chosen are oil-soluble. Typical would be 2,2,'-azo-bis(isobutyronitrile), 2,2'-azobis (2,4-dimethylvaleronitrile) and benzoyl peroxide, and the like. It is well known to those skilled in the art that the initiator(s) can be chosen to be either water- or oil-soluble depending on the particular needs of the system.

The water-in-oil emulsifying agent is usually a low HLB surfactant. Typical emulsifiers are mono and di-gylcerides, sorbitan fatty acid esters and lower N, N-dialkanol substituted fatty amides, and the like, and are also described in U.S. Pat. Re. No. 28,576.

A mixture of emulsifying surfactants, rather than single emulsifier, may be preferred. The concentration of emulsifier can be from about 3% to about 30% by weight, based on the total weight of the oil phase. Polymeric surfactants such as modified polyester surfactants (Hypermer, ICI) and maleic anhydride-substituted ethylene copolymers (PA-14 or 18, Chevron) may also be added to improve the mechanical stability and increase the solids content of the emulsion.

After the aqueous phase and oil phase have been prepared separately, the aqueous phase is then homogenized into the oil phase. Homogenizers, high shear pumps, or high speed agitators that are capable of mixing the two phases into a homogeneous water-in-oil emulsion may be used. Any of the techniques to prepare the inverse emulsions well known to those skilled in the art may be used. The particle size of the resulting emulsion is usually less than 10 $\mu$m and preferably less than 2 $\mu$m. After the emulsion is prepared, the system is then sparged with nitrogen to remove all oxygen from the system. The emulsion is under constant agitation or circulation. Polymerization is then initiated by adding a reducing agent from a redox pair or by heat to induce the decomposition of initiator in the emulsion. The temperature of the reaction medium is maintained at about 20° C. to about 75° C., preferably about 35° C. to about 55° C.

After the polymerization is substantially complete, a solution of sodium metabisulfite, sodium bisulfite or SO2 gas is further added to stabilize the emulsion and to remove any residual monomers.

As differentiated from the prior art, no inverting surfactant is added to the resulting emulsion.

The water-in-oil emulsion thus produced rapidly disperses and dissolves into an aqueous solution upon being added to water. Within minutes, a maximum solution viscosity is obtained.

The following examples are set forth for purposes of illustration only and are not to be construed as limitations on the present invention except as set forth in the appended claims. All parts and percentages are by weight unless otherwise specified. For all viscosity determinations, Surfonic N-95 inverting surfactant was added to the aqueous salt solutions.

EXAMPLE 1

Procedure For Preparing PPGMM Containing Emulsion

Aqueous Phase: to a suitable vessel were added 26.3 parts of deionized water, 100.65 parts (59 mole per cent) of acrylamide (50.0% aqueous), 123.84 parts (40 mole per cent) of acryloyloxyethyltrithylammonium chloride (AETAC) (75 % aqueous), and 4.91 parts (1 mole percent) of polypropyleneglycol monomethacrylate (PPGMM, Alcolac, 99%). To this solution were added 0.30 parts of disodium ethylenediamine tetraacetic acid solution (Versenex, Dow, 50.0% aqueous), 0.95 parts of t-butylhydroperoxide (t-BHP),(2.5% aqueous) and 0.03 parts of 2,2'-azobis-(2-amidinopropane) dihydrochloride (V-50, Wako).

The oil phase was prepared by dissolving 6.17 parts of sorbitan monooleate (Arlacel 80, ICI) and 2.65 parts of polyoxyethylene(5) sorbitan monoleate (Tween 81, ICI) in 89.14 parts of deodorized kerosene (LOPS, Exxon). The aqueous phase was then added to the oil phase using a Silverson Homogenizer. The mixture was homogenized at medium speed and then at high speed to obtain the desired viscosity range.

The emulsion was charged to a suitable reaction vessel and purged with nitrogen gas for 30 minutes with stirring. With continued stirring, 4.96 parts of dilute sodium metabisulfite solution was slowly pumped into the reactor over a period of 2.5 hours while maintaining the reactor at 40°–45° C. The emulsion was then heated at 45° C. or 1.5 hours. To the emulsion was then added 5.0 parts of a 30.0% aqueous sodium metabisulfite solution. The emulsion was stirred at 45° C. for an additional 0.5 hour before being cooled to room temperature and filtered.

The resulting emulsion dissolved readily in water to give a viscous polymer solution. A 0.3% solution of this polymer in 4.0% aqueous NaCl had a viscosity of 24.9 cps.

EXAMPLE 2

The apparatus and procedure were similar to that described in Example 1, with a slight change in the emulsifying surfactants. This example contained a higher total concentration of the emulsifying surfactants (same ratio) than in Example 1. All other quantities were the same as in Example 1.

The formulation is as follows:

| Aqueous Phase: | |
|---|---|
| AMD (50%) | 100.65 parts |
| AETAC (75%) | 123.84 |
| PPGMM (99%) | 4.91 |
| DI Water | 26.29 |
| t-BHP (2.5%) | 0.95 |
| Versenex 80 | 0.30 |
| V-50 | 0.03 |
| | 256.97 parts |
| Oil Phase: | |

-continued

| | |
|---|---|
| Arlacel 80 | 7.46 parts |
| Tween 81 | 3.19 |
| LOPS | 89.14 |
| | 99.79 parts |
| Total Weight: | 356.76 parts |
| Overall Solids: | 41.8% |

The resulting emulsion required approximately one hour of agitation in order to completely invert in water to form a viscous polymer solution. A 0.3% solution of this polymer in 4.0% aqueous NaCl had a viscosity of 23.8 cps. This emulsion was stable at ambient conditions for 2 months and also remained homogeneous after 3 freeze-thaw cycles.

COMPARATIVE EXAMPLE A

The apparatus, weights and procedure were similar to that described in Example 1, except that no PPGMM monomer was used. The resulting emulsion contained 60 mole per cent of acrylamide and 40 mole per cent of acryloyloxyethyltrimethylammonium chloride. The formulation was a follows:

| Aqueous Phase: | |
|---|---|
| AMD (50%) | 102.36 parts |
| AETAC (75%) | 123.84 |
| DI Water | 22.54 |
| t-BHP (2.5%) | 0.95 |
| Versenex | 0.30 |
| V-50 | 0.03 |
| | 250.02 |
| Oil Phase: | |
| Arlacel 80 | 6.01 parts |
| Tween 81 | 2.57 |
| LOPS | 86.73 |
| | 95.31 |
| Total Weight: | 345.33 parts |
| Overall Solids: | 41.8% |

The emulsion was stabilized with 5.0 parts of a 30.0% aqueous solution of sodium metabisulfite as in Example 1. A portion of the emulsion was removed and designated as Comparative Example A.

An inverting surfactant mixture was then added to the remaining emulsion at a concentration of 2.8% based on the emulsion. The inverting surfactant mixture was composed of two water soluble surfactants: $C_{11}-C_{15}$ secondary alcohol ethoxylate (Tergitol 15-S-7, Union Carbide) and sodium dioctylsulfosuccinate (Aerosol OT-S, Cyanamid). The inverting agent mixture was added to the emulsion over 0.5 hour while holding at 45° C. The emulsion was stirred for another 0.5 hour at 45° C. and finally cooled and filtered off. This emulsion was designated as Comparative Example B.

Comparative Example B dissolved readily in water to give a viscous solution. A 0.3% solution of this polymer in 4.0% aqueous NaCl had a viscosity of 22.8 cps.

EMULSION INVERSION STUDY

An inversion study was conducted to evaluate the emulsions. In a large beaker, 600 g of deionized water was stirred at 600 rpm with a constant speed agitator. A calculated amount of emulsion, to yield a 0.1% active weight of polymer in solution was added. The emulsions were all 41.8% active polymer. The viscosity of the resulting solution was measured over a period of time. A rapid increase in solution viscosity and no clumps in the aqueous phase usually indicated a good inversion. Examples 1 and 2, and Comparative Examples A and B are described above. Comparative example C was prepared by adding the PPGMM to the emulsion after the polymerization, thus it was not incorporated into the polymer. Composition of the polymers used in the study are shown in Table I, and the results of the study are shown in Table II.

TABLE I

COMPOSITION OF THE POLYMERS

| Sample | Mole % AMD | Mole % AETAC | Mole % PGMM |
|---|---|---|---|
| 1 | 59.0 | 40.0 | 1.0 |
| 2 | 59.0 | 40.0 | 1.0 |
| A | 60.0 | 40.0 | 0.0 |
| B | 60.0 | 40.0 | 0.0 |
| C | 60.0 | 40.0 | 1.0* |

*Monomer added after polymerization

TABLE II

EMULSION INVERSION STUDY

| Example | Stirred (min) | Total Time Visc. (cps) | Bulk Appearance |
|---|---|---|---|
| 1 | 2.0 | 320 | small amt. of clumps |
| | 5.0 | 475 | homogeneous |
| | 10.0 | 475 | small amt. of clumps |
| | 30.0 | 415 | homogeneous |
| 2 | 2.0 | 5 | finely divided solids |
| | 5.0 | 24 | finely divided solids |
| | 10.0 | 67 | finely divided solids |
| | 15.0 | 96 | less solids |
| | 30.0 | 165 | less solids |
| | 60.0 | 375 | less solids |
| | 90.0 | 420 | homogeneous |
| A | 2.0 | 9 | many solids |
| | 5.0 | 29 | many solids |
| | 10.0 | 48 | many solids |
| | 15.0 | 59 | many solids |
| | 20.0 | 65 | less solids |
| | 25.0 | 71 | less solids |
| | 30.0 | 73 | less solids |
| | 40.0 | 76 | less solids |
| | 50.0 | 80 | less solids |
| | 60.0 | 83 | less solids |
| | 180.0 | 125 | solids still present |
| B | 2.0 | 249 | no solids; gel on shaft |
| | 5.0 | 235 | homogeneous |
| | 10.0 | 235 | no solids; gel on shaft |
| | 30.0 | 220 | homogeneous |
| C | 2.0 | 14 | many solids |
| | 5.0 | 24 | many solids |
| | 10.0 | 31 | many solids |
| | 15.0 | 35 | many solids |
| | 20.0 | 40 | less solids |
| | 25.0 | 46 | less solids |
| | 30.0 | '49 | less solids |
| | 60.0 | 61 | solids still present |

This inversion study shows that the instant invention with the PPGMM containing polymer and without inverting surfactants (Example 1) inverts as well as the prior art emulsion (Comparative Example B, with inverting surfactants added). Both of these solutions reached a maximum viscosity and became homogeneous in 5 minutes. The decrease in solution viscosity of Examples 1 and B after 10 minutes of stirring is considered an artifact of the high shear conditions. Comparative Example A shows that a similar emulsion but without either PPGMM or inverting surfactants required a very long time to invert in water.

Comparative Example C shows that a similar emulsion with PPGMM monomer added after the polymerization also inverted very slowly in water. These results show that the PPGMM monomer is not acting as an inverting surfactant itself and proves that the PPGMM is incorporated into the polymer (Example 1).

Example 2 was prepared with a higher concentration of the emulsifying surfactants than in Example 1 in order to study the effect on emulsion stability. It has been discovered that the rate at which these emulsions invert into water appears to be inversely related to their stability over time. Similarly to emulsions prepared with inverting surfactants, there is a narrow range of concentration of the "minor component" monomer in which the emulsions will remain as a water-in-oil emulsion and still invert quickly to the oil-in-water form upon introduction to water. If the copolymer contains too much of the PPGMM, for example, the emulsion may invert upon standing. Example 2 contains the same mole % of PPGMM as Example 1 but requires a longer time to dissolve and exhibits better long term stability than Example 1. The initial HLB value of the emulsion prior to polymerization may also affect the rate of inversion and long term stability of the emulsion system.

Additional comparative studies were conducted using two allyl ether monomers of the Flesher '844 patent, compared with two examples of the instant invention.

Example 3 was a repeat preparation of Example 1, and the monomer that was used in Example 4 to impart self-inverting characteristics to the inverse emulsion was similar to the hydrophobic allyl ether monomers of the Flesher the '844 patent, wherein in Formula (a) of the '844 patent (column 5, line 37) R=C alkyl (butyl), $R^1$ and $R^2$=hydrogen, Q=CH$_2$O, n is about 10, and m is zero, i.e., allyl ether having 10 moles of ethoxylation, with a butyl endcap.

The monomer was prepared similarly to the hydrophobic monomers described below, from the reaction of butyl chloride with polyethylene glycol monoallyl ether having 9.6 moles of ethoxylation. This monomer will be referred to as PEGMAE-C4. This monomer was soluble in water.

Comparative Examples D and E, hydrophobic allyl ether monomers described in the '844 patent, were prepared from the reaction of octyl and octadecyl chlorides with polyethylene glycol monoallyl ether (9.6 moles of ethylene oxide, Alcolac DV-1880). The structure of the compounds synthesized (confirmed by C13 NMR) corresponds to the preferred monomers (a) of the '844 patent, shown in Column 5, line 37, wherein R' and $R^2$ are hydrogen, Q=CH$_2$O, n is about 10, m is zero, and R is either 8 or 18. These monomers will be referred to below as PEGMAE-C8 and PEGMAE-C18, respectively. These monomers were not water soluble.

EXAMPLE 3

AMD/AETAC/PPGMM Emulsion

The apparatus, charge and procedure were similar to that described in Example 1. The resulting emulsion contained 59.5 mole % of acrylamide, 40.0 mole % of acrylyloxyethyltrimethylammonium chloride, and 0.5 mole % of PPGMM.

The formulation is shown as follows:

| Aqueous Phase: | AMD (50%) | 101.50 parts |
|---|---|---|
| | AETAC (75%) | 123.84 |
| | PPGMM (99%) | 2.45 |
| | DI water | 22.14 |
| | t-BHP (2.5%) | 0.65 |

-continued

| | | | |
|---|---|---|---|
| | EDTA (5.6%) | 2.68 | |
| | | 253.26 | |
| Oil Phase: | Arlacel 80 | 6.87 | parts |
| | Tween 81 | 2.95 | |
| | Soltrol 145 | 88.40 | |
| | | 98.22 | |
| | Total Weight: | 351.48 | parts |
| | overall Solids: | 41.6% | |

A 0.3% solution of the resulting polymer in 4.0% aqueous NaCl had a viscosity of 23.0 cps.

EXAMPLE 4

AMD/AETAC/PEGMAE-C4 Emulsion

The apparatus, charge and procedure similar to that described in Example 3 were used, substituting PEGMAE-C4 for PPGMM. The resulting emulsion contained 59.5 mole % of acrylamide, 40.0 mole % of acrylyloxyethyltrimethylammonium chloride, and 0.5 mole % of PEGMAE-C4. The formulation was as follows:

| | | | |
|---|---|---|---|
| Aqueous Phase: | AMD (50%) | 101.50 | parts |
| | AETAC (75%) | 123.84 | |
| | PEGMAE-C4 | 3.22 | |
| | DI water | 23.70 | |
| | t-BHP (2.5%) | 0.95 | |
| | Versenex | 0.30 | |
| | V-50 | 0.03 | |
| | | 253.54 | |
| Oil Phase: | Arlacel 80 | 7.15 | parts |
| | Tween 81 | 3.06 | |
| | Soltrol 145 | 88.25 | |
| | | 98.46 | |
| | Total Weight: | 352.00 | parts |
| | Overall Solids: | 41.8% | |

A 0.3% solution of the resulting polymer in 4.0% aqueous NaCl had a Brookfield viscosity of 21.8 cps.

COMPARATIVE EXAMPLE D

AMD/AETAC/PEGMAE-C8 Emulsion

The apparatus, charge and procedure similar to that described in Example 3 were used, substituting PEGMAE-C8 for PPGMM. The resulting emulsion contained 59.5 mole % of acrylamide, 40.0 mole % of acrylyloxyethyltrimethylammonium chloride, and 0.5 mole % of PEGMAE-C8. The formulation was as follows:

| | | | |
|---|---|---|---|
| Aqueous Phase: | AMD (50%) | 101.50 | parts |
| | AETAC (75%) | 123.84 | |
| | PEGMAE-C8 | 3.56 | |
| | DI water | 23.95 | |
| | t-BHP (2.5%) | 0.65 | |
| | Versenex | 0.30 | |
| | V-50 | 0.03 | |
| | | 254.10 | |
| Oil Phase: | Arlacel 80 | 7.16 | parts |
| | Tween 81 | 8.13 | |
| | Soltrol 145 | 93.41 | |
| | | 108.70 | |
| | Total Weight: | 362.83 | parts |
| | Overall Solids: | 40.6% | |

A 0.3% solution of the resulting polymer in 4.0% aqueous NaCl had a Brookfield viscosity of 17.4 cps.

COMPARATIVE EXAMPLE E

AMD/AETAC/PEGMAE-C18 Emulsion

The apparatus, charge and procedure similar to that described in Example 3 were used, substituting PEG-MAE-C18 for PPGMM. The resulting emulsion contained 59.5 mole % of acrylamide, 40.0 mole % of acrylyloxyethyltrimethylammonium chloride, and 0.5 mole % of PEGMAE-C18. The formulation was as follows:

| Aqueous Phase: | AMD (50%)    | 101.50 parts |
|----------------|--------------|--------------|
|                | AETAC (75%)  | 123.84       |
|                | PEGMAE-C18   | 4.40         |
|                | DI water     | 24.56        |
|                | t-BHP (2.5%) | 0.95         |
|                | Versenex     | 0.30         |
|                | V-50         | 0.03         |
|                |              | 255.58       |
| Oil Phase:     | Arlacel 80   | 7.21 parts   |
|                | Tween 81     | 8.09         |
|                | Soltrol 145  | 88.95        |
|                |              | 104.25       |
|                | Total Weight:| 359.83 parts |
|                | Overall Solids: | 41.2%     |

A 3.0% solution of the resulting polymer in 4.0% aqueous NaCl had a Brookfield viscosity of 19.9 cps.

The composition of the polymers is shown in Table III, and the inversion studies are shown in Table IV.

TABLE III

COMPOSITION OF THE POLYMERS

| Example | Description | Mole % AMD | Mole % AETAC | Mole % Monomer |
|---------|-------------|------------|--------------|----------------|
| 3       | PPGMM       | 59.5       | 40.0         | 0.5            |
| 4       | PEGMAE-C4   | 59.5       | 40.0         | 0.5            |
| D       | PEGMAE-C8   | 59.5       | 40.0         | 0.5            |
| E       | PEGMAE-C18  | 59.5       | 40.0         | 0.5            |

Inversion studies similar to those previously described were then conducted by using the polymers described in Table III. Results are shown in Table IV.

TABLE IV

EMULSION INVERSION STUDY

| Example | Conc. (wt. %) | Total Time Stirred (min.) | Viscosity (cps) | Appearance |
|---------|---------------|---------------------------|-----------------|------------|
| 3       | 0.1           | 2.0                       | 25.0            | many solids |
|         | "             | 5.0                       | 71.0            | "          |
|         | "             | 10.0                      | 402.5           | few solids |
|         | "             | 15.0                      | 432.5           | "          |
|         | "             | 20.0                      | 452.5           | homogeneous |
|         | "             | 30.0                      | 485.0           | "          |
|         | "             | 40.0                      | 470.0           | "          |
| 4       | "             | 2.0                       | 21.0            | many solids |
|         | "             | 5.0                       | 50.0            | "          |
|         | "             | 10.0                      | 70.0            | "          |
|         | "             | 15.0                      | 78.0            | "          |
|         | "             | 20.0                      | 84.0            | less solids |
|         | "             | 25.0                      | 89.0            | "          |
|         | "             | 30.0                      | 94.0            | "          |
|         | "             | 40.0                      | 104.5           | "          |
|         | "             | 60.0                      | 135.5           | "          |
|         | "             | 90.0                      | 171.0           | some solids still present |
| D       | 0.1           | 2.0                       | 17.0            | many solids |
|         | "             | 5.0                       | 48.0            | "          |
|         | "             | 10.0                      | 62.0            | "          |
|         | "             | 15.0                      | 67.0            | "          |
|         | "             | 20.0                      | 78.0            | "          |
|         | "             | 25.0                      | 85.0            | less solids |
|         | "             | 30.0                      | 92.0            | "          |
|         | "             | 40.0                      | 96.0            | "          |
|         | "             | 60.0                      | 124.0           | "          |
|         | "             | 90.0                      | 140.0           | some solids still present |
| E       | 0.1           | 2.0                       | 10.0            | many solids |
|         | "             | 5.0                       | 29.0            | "          |
|         | "             | 10.0                      | 43.0            | "          |
|         | "             | 15.0                      | 49.0            | "          |
|         | "             | 20.0                      | 55.0            | "          |
|         | "             | 25.0                      | 59.0            | "          |
|         | "             | 30.0                      | 65.0            | "          |
|         | "             | 40.0                      | 67.0            | less solids |
|         | "             | 60.0                      | 69.0            | "          |
|         | "             | 90.0                      | 73.0            | "          |

This inversion study shows that neither of the hydrophobic allyl ether monomers of the '844 patent impart self-inverting characteristics to the inverse emulsions. Example E (R=C18 alkyl) showed no better breaking than comparative Example A (AMD/AETAC with no inverting surfactant added). Example D (R=C8 alkyl) inverted slightly better than Example E, but still unacceptably slowly. Neither of the comparative examples fully inverted within the time frame of the study, as evidenced by their not achieving the full viscosity achieved by Example 3. Example 4 was able to achieve higher viscosity than either comparative example, but still not the full viscosity of Example 3. Its inverting behavior is considered marginal.

It is believed that at least one reason that the hydrophobic monomers of the '844 patent do not impart self-inverting characteristics to the emulsions is because of their insolubility in water, which prevents their being incorporated into the polymer structure to the extent that the monomers of the instant invention are incorporated.

Additional emulsions were prepared by incorporating PPGMM into anionic and nonionic polymers.

EXAMPLE 5

Anionic Inverse Emulsion Containing PPGMM

Aqueous Phase: to a suitable reactor were added 90.6 parts deionized water, 124.5 parts of acrylamide (50.0% aqueous), 27.5 parts glacialacrylic acid (99%), and 2.6 parts PPGMM. To this solution were added 3.2 parts of disodium ethylenediamine tetraacetic acid solution (5.6% aqueous), 8.2 parts ammonium hydroxide (30.0% aqueous), and 0.8 parts of t-BHP (1.4% aqueous). The monomer composition was 69.5 mole % acrylamide, 30.0 mole % acrylic acid, and 0.5 mole % PPGMM.

The oil phase was prepared by dissolving 4.9 parts of sorbitan monooleate (Arlacel 80, ICI) and 2.1 parts of polyoxyethylene (5) sorbitan monooleate (Tween 81, ICI) in 89.3 parts of deodorized kerosene (LOPS, Exxon). The aqueous phase was then added to the oil phase using a Silverson Homogenizer. The mixture was homogenized at medium speed and then at high speed to obtain the desired viscosity range.

The emulsion was charged to a suitable reaction vessel and purged with nitrogen gas for 30 minutes with stirring. Then, 3.6 parts of sodium metabisulfate as a 0.50% aqueous solution was slowly added over 3.5 hours. The reducing agent was added at such a rate as to maintain the reaction at 40°-45° C.

The emulsion was stabilized by adding 7.0 parts of a 30.0% aqueous solution of sodium metabisulfite over 0.5 hours while maintaining the reaction at 40° C. The emulsion was stirred at 40° C. for an additional 0.5 hours and then cooled and filtered to remove any particles. The resulting emulsion required approximately one hour of agitation in order to completely dissolve in water. Although the anionic emulsion appeared to invert slower than the cationic counterparts, our new inversion technology is applicable to anionic emulsion systems.

EXAMPLE 6

Nonionic Inverse Emulsion Containing PPGMM

Aqueous Phase: to a suitable vessel were added 53.7 parts deionized water, 193.3 parts of acrylamide (50.0% aqueous), and 2.8 parts of PPGMM (99.5 mole per cent acrylamide, 0.5 mole percent PPGMM). To this solution were added 6.9 parts of disodium ethylenediaminetetraacetic acid solution (5.6% aqueous), and 0.5 parts of t-butylhydroperoxide (1.4% aqueous).

Oil phase: 6.4 parts of sorbitan monooleate (Arlacel 80, ICI) and 2.7 parts of polyoxyethylene (5) sorbitan monooleate (Tween 81, ICI) were dissolved in 90.9 parts of deodorized kerosene (LOPS, Exxon).

The aqueous phase was then added to the oil phase using a Silverson Homogenizer. The mixture was homogenized at medium speed and then a high speed to obtain the desired viscosity range.

The emulsion was charged to a suitable reaction vessel and purged with nitrogen gas for 30 minutes with stirring, followed by the addition of 3.86 parts of sodium metabisulfite as a 0.50% aqueous solution over a period of 4 hours. The reducing agent was added at such a rate as to maintain the reaction at 40°-45° C.

The emulsion was then stabilized by adding 6.8 parts of a 30.0% aqueous solution of sodium metabisulfite over 0.5 hours while maintaining the reaction at 40° C. The emulsion was stirred at 40° C. for an additional 0.5 hours and then cooled and filtered to remove any particles. The resulting emulsion inverted very poorly into water. Only after extensive agitation did the emulsion begin to invert. After one hour of stirring at 600 rpm the solution viscosity was only 65 cps. It appears that the present invention is not applicable to the nonionic emulsion system.

Sludge Dewatering Test

To confirm activity of the polymers prepared according to the invention, a polymer prepared similar to Example 1 was evaluated against a commercial material with the same cationicity. Sludge from a southwest refinery was used. Equivalent performance was obtained by a capillary suction test (CST).

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. Composition of a self-inverting, water-in-oil emulsion comprising a water-soluble copolymer which contains acrylamide, a cationic monomer and a third monomer having the structure:

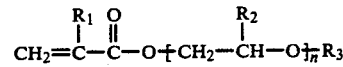

wherein $R_1$ is hydrogen or methyl; $R_2$ is hydrogen, methyl or ethyl; $R_3$ is hydrogen or $C_1$-$C_4$ alkyl; and n is from 1 to 100.

2. Composition according to claim 1 wherein said third monomer is about 0.01 to about 10 mole percent of said copolymer.

3. Composition according to claim 1 wherein said emulsion is free of an inverting surfactant.

4. Composition according to claim 1, wherein said water-soluble copolymer has a molecular weight from about 10,000 to about 30,000,000.

5. Composition according to claim 1, wherein said water-soluble copolymer has a molecular weight above about 1,000,000.

6. Composition according to claim 1, in which $R_1$ and $R_2$ are methyl; $R_3$ is hydrogen; and n is 5 to 6.

7. Composition according to claim 1, wherein the cationic monomer has the structure

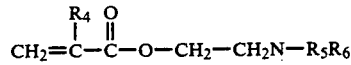

wherein $R_4$ is hydrogen or methyl; $R_5$ and $R_6$ are independently $C_1$ to $C_4$ lower alkyl groups; water-soluble salts or quaternary ammonium salts thereof.

8. Composition according to claim 7, wherein the cationic monomer is diallyldimethylammonium chloride.

9. Composition according to claim 7, wherein $R_4$ is hydrogen or methyl, and $R_5$ and $R_6$ are either methyl or ethyl.

10. Composition according to claim 7, wherein said cationic monomer is quaternized with methyl chloride or dimethyl sulfate.

11. Composition according to claim 1, wherein said cationic monomer is acryloyloxyethyltrimethyl ammonium chloride.

12. Composition according to claim 7, wherein said cationic monomer is methacryloyloxyethyltrimethylammonium chloride.

13. Composition according to claim 7, wherein said cationic is methacryloyloxyethyltrimethylammonium methosulfate.

14. Composition according to claim 7, wherein said cationic monomer is acryloyloxyethyldiethylmethylammonium methosulfate.

* * * * *